US009544480B2

(12) United States Patent
Katoh et al.

(10) Patent No.: US 9,544,480 B2
(45) Date of Patent: Jan. 10, 2017

(54) GIMBAL DEVICE AND CONTROL METHOD OF GIMBAL DEVICE

(71) Applicant: JVC KENWOOD Corporation, Yokohama-shi, Kanagawa (JP)

(72) Inventors: Hidehiro Katoh, Yokohama (JP); Kensuke Taguchi, Yokohama (JP); Kazuhiko Kobayashi, Yokohama (JP); Kazuyuki Takao, Yokohama (JP); Teppei Kubota, Yokohama (JP); Itsuki Kato, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 14/926,297

(22) Filed: Oct. 29, 2015

(65) Prior Publication Data
US 2016/0150134 A1 May 26, 2016

(30) Foreign Application Priority Data
Nov. 25, 2014 (JP) .................................. 2014-237393

(51) Int. Cl.
*H04N 5/225* (2006.01)
*H04N 5/232* (2006.01)
*G01C 21/18* (2006.01)

(52) U.S. Cl.
CPC ............ *H04N 5/2252* (2013.01); *G01C 21/18* (2013.01); *H04N 5/2253* (2013.01); *H04N 5/232* (2013.01)

(58) Field of Classification Search
CPC .... H04N 5/2252; H04N 5/232; H04N 5/2253; G01C 21/18
See application file for complete search history.

(56) References Cited

U.S. PATENT DOCUMENTS

| 6,536,724 | B2 * | 3/2003 | Furuta | F16M 11/123 248/178.1 |
| 6,639,625 | B1 * | 10/2003 | Ishida | H04N 1/0402 348/218.1 |
| 7,812,507 | B2 * | 10/2010 | Takahashi | H02N 2/0025 310/328 |

(Continued)

FOREIGN PATENT DOCUMENTS

JP 2010128814 A 6/2010

*Primary Examiner* — James Hannett
*Assistant Examiner* — Padma Haliyur
(74) *Attorney, Agent, or Firm* — Nath, Goldberg & Meyer; Jerald L. Meyer

(57) ABSTRACT

A gimbal device includes a controller for controlling a gimbal mechanism to which an imaging device is fixed. The controller includes an angular velocity signal acquisition unit, a relative angle acquisition unit, and an angular velocity signal synthesizer. The angular velocity signal acquisition unit acquires first to third angular velocity signals. The relative angle acquisition unit acquires first and second relative angles. The angular velocity signal synthesizer generates from the first to third angular velocity signals and the first and second relative angles, first to third rotational shift angular velocity signals which are signals of a first rotational shift angular velocity about an axis parallel to a first correction axis, a second rotational shift angular velocity about an axis parallel to a second correction axis, and a third rotational shift angular velocity about an axis parallel to a third correction axis, respectively.

4 Claims, 9 Drawing Sheets

(56) References Cited

U.S. PATENT DOCUMENTS 8,118,488 B2 * 2/2012 Gregerson ........... A61B 5/0555
378/196
8,212,880 B2 * 7/2012 Anderson ............ H04N 5/2252
348/208.7

* cited by examiner

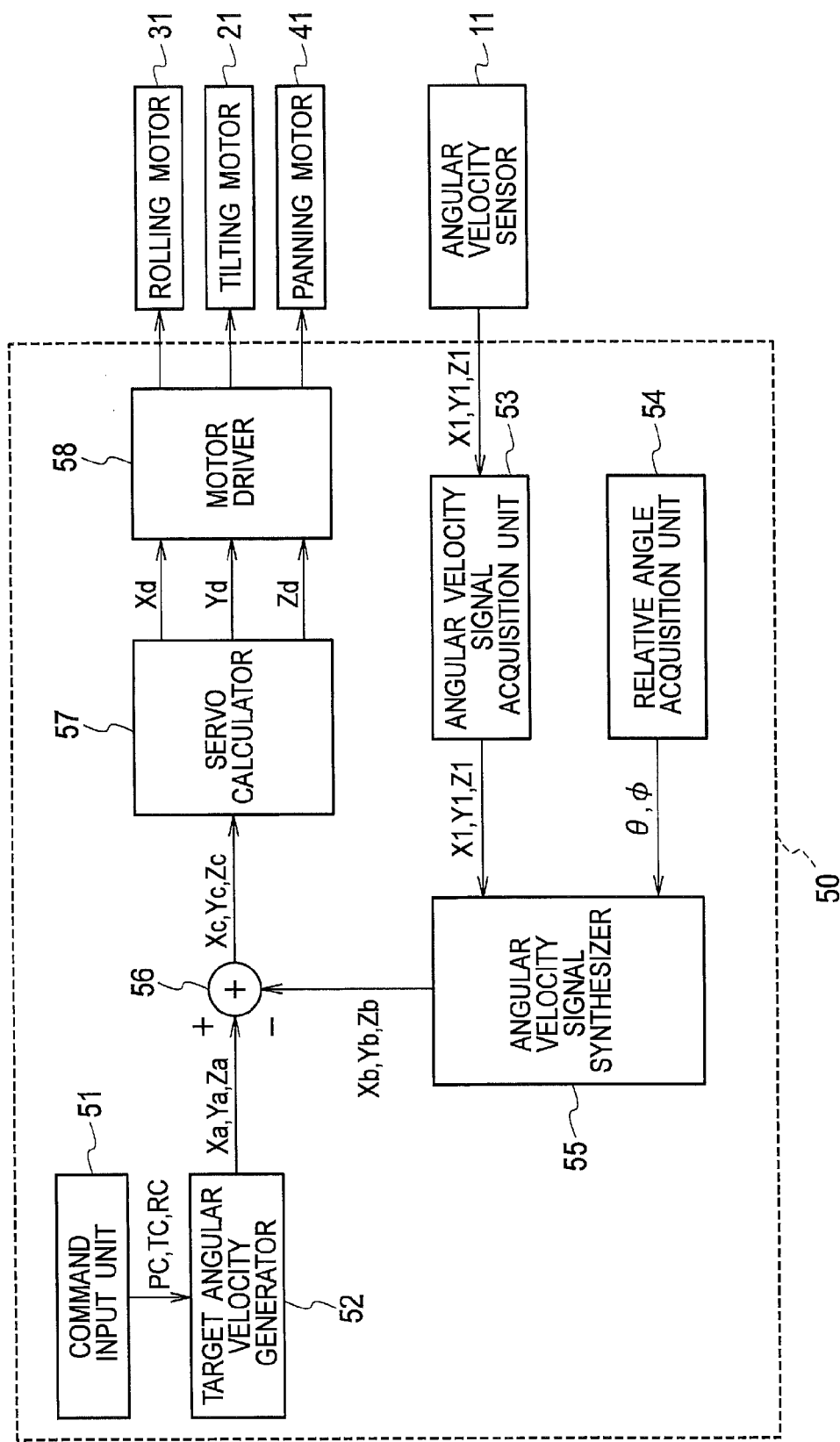

FIG. 4
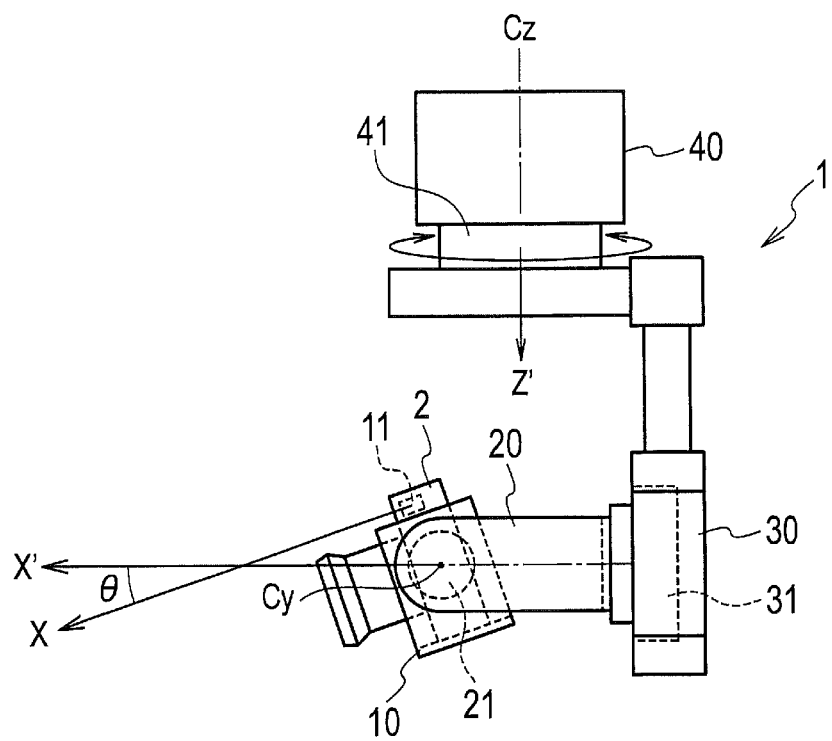
FIG. 5A
FIG. 5B
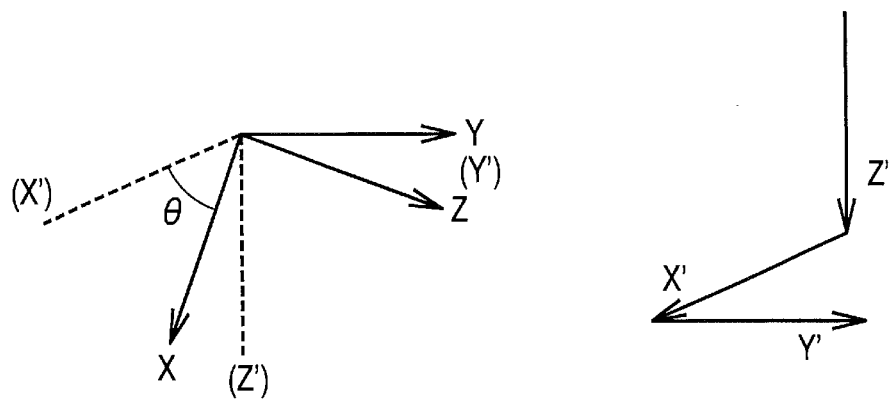

FIG. 11
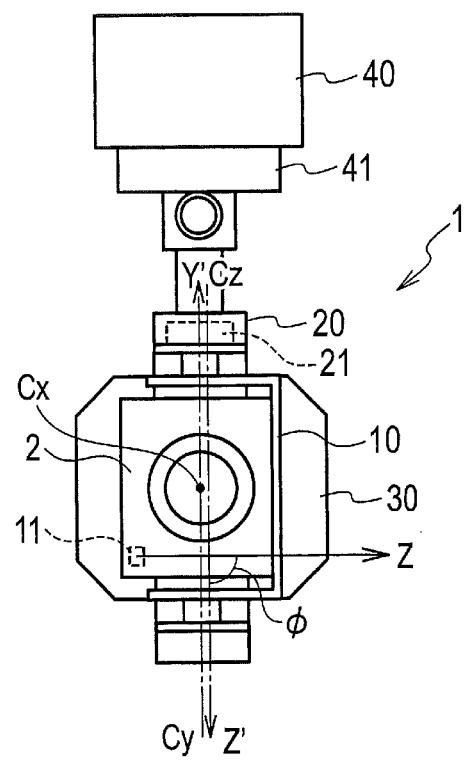
FIG. 12A
FIG. 12B
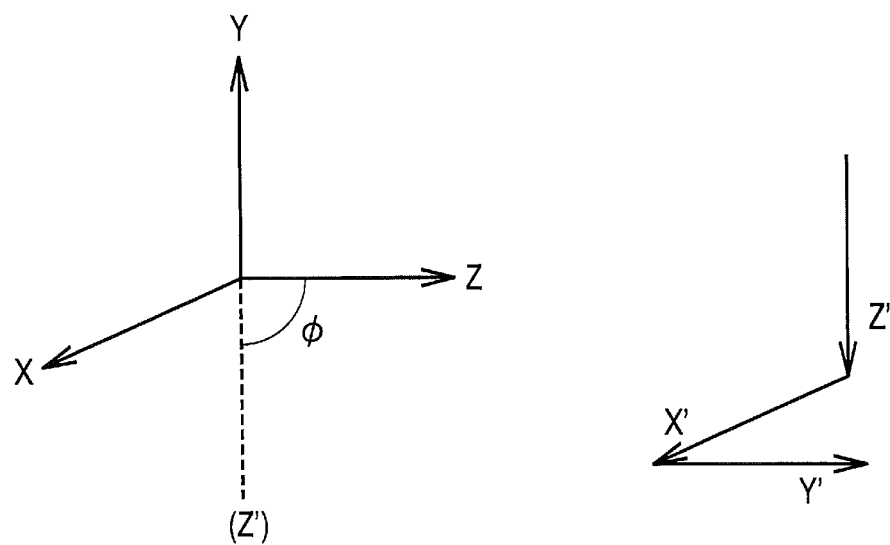

GIMBAL DEVICE AND CONTROL METHOD OF GIMBAL DEVICE

CROSS REFERENCE TO RELATED APPLICATION

This application is based upon and claims the benefit of priority under 35 U.S.C. §119 from Japanese Patent Application No. 2014-237393, filed on Nov. 25, 2014, the entire contents of which are incorporated herein by reference.

BACKGROUND

The present disclosure relates to a gimbal device and a control method of the gimbal device.

When taking pictures while moving the imaging device such as a video camera or when airborne imaging is performed with the imaging device mounted to an unmanned helicopter or airplane, it is necessary to control the attitude (position or orientation) of the imaging device with high accuracy to prevent the visual axis from shaking.

Picture taking in which the attitude of the imaging device needs to be controlled generally employs a gimbal device to which the imaging device is attachable.

Japanese Unexamined Patent Application Publication No. 2010-128814 (Patent Document 1) describes an example of gimbal devices to control the attitude of an imaging device.

SUMMARY

The gimbal device as described in Patent Document 1 generally detects rotational shift of the imaging device based on detection axes X, Y and Z, which are orthogonal to each other, and corrects the detected rotational shift with correction axes X', Y' and Z', which are orthogonal to each other.

When the imaging device is positioned in a basic attitude, the detection axes X, Y and Z are parallel to the correction axes X', Y' and Z', respectively. Therefore, when the imaging device is positioned in the basic attitude, the detection axes X, Y and Z directly correspond to the correction axes X', Y' and Z', respectively.

When a clockwise rotational shift around the detection axis X is detected, for example, the rotational shift can be cancelled by rotating the imaging device counterclockwise around the correction axis X'.

On the other hand, when the imaging device is inclined at a predetermined angle about the detection axis Y from the basic attitude, for example, the correction axis Y' is parallel to the detection axis Y, and the correction axis Y' thus directly corresponds to the detection axis Y. However, the detection axis X is not parallel to the correction axis X' and does not directly correspond to the detection axis X. The detection axis Z is also not parallel to the correction axis Z' and does not directly correspond to the detection axis Z.

With the conventional gimbal device as disclosed in Patent Document 1, the detection axes do not directly correspond to the respective correction axes when the imaging device is inclined (when the imaging device is inclined greatly in particular). Accordingly, even if the rotational shift detected by the detection axis X were corrected with the correction axis X', for example, the rotational shift cannot be cancelled. It is therefore difficult to control the attitude of the imaging device with high accuracy.

A first aspect of the embodiments provides a gimbal device including: a controller configured to control a gimbal mechanism to which an imaging device is fixed, wherein detection axes for detecting rotational shift of the imaging device are defined as first to third detection axes which are orthogonal to each other, correction axes for correcting the rotational shift of the imaging device are defined as first to third correction axes which are orthogonal to each other. The controller includes: an angular velocity signal acquisition unit configured to acquire first to third angular velocity signals which are signals of first angular velocity about an axis parallel to the first detection axis, second angular velocity about an axis parallel to the second detection axis, and third angular velocity about an axis parallel to the third detection axis, respectively; a relative angle acquisition unit configured to acquire a first relative angle between the second detection axis and the second correction axis in a two-dimensional plane orthogonal to the first correction axis and a second relative angle between the third detection axis and the third correction axis in a two-dimensional plane orthogonal to the second correction axis; and an angular velocity signal synthesizer configured to generate from the first to third angular velocity signals and the first and second relative angles, first to third rotational shift angular velocity signals which are signals of a first rotational shift angular velocity about an axis parallel to the first correction axis, a second rotational shift angular velocity about an axis parallel to the second correction axis, and a third rotational shift angular velocity about an axis parallel to the third correction axis, respectively.

A second aspect of the embodiments provides a control method of controlling a gimbal device including a gimbal mechanism to which an imaging device is fixed, wherein detection axes for detecting rotational shift of the imaging device are defined as first to third detection axes which are orthogonal to each other, correction axes for correcting the rotational shift of the imaging device are defined as first to third correction axes which are orthogonal to each other. The control method includes: generating first to third target angular velocity signals which are signals of first target angular velocity about an axis parallel to the first correction axis, second target angular velocity about an axis parallel to the second correction axis, and third target angular velocity about an axis parallel to the third correction axis, respectively; acquiring first to third angular velocity signals which are signals of first angular velocity about an axis parallel to the first detection axis, second angular velocity about an axis parallel to the second detection axis, and third angular velocity about an axis parallel to the third detection axis, respectively; acquiring a first relative angle between the second detection axis and the second correction axis in a two-dimensional plane orthogonal to the first correction axis and a second relative angle between the third detection axis and the third correction axis in a two-dimensional plane orthogonal to the second correction axis; generating from the first to third angular velocity signals and the first and second relative angles, first to third rotational shift angular velocity signals which are signals of a first rotational shift angular velocity about an axis parallel to the first correction axis, a second rotational shift angular velocity about an axis parallel to the second correction axis, and a third rotational shift angular velocity about an axis parallel to the third correction axis, respectively; generating a first correction angular velocity signal from the first target angular velocity signal and the first rotational shift angular velocity signal, generating a second correction angular velocity signal from the second target angular velocity signal and the second rotational shift angular velocity signal, and generating a third correction angular velocity signal from the third target angular velocity signal and the third rotational shift angular velocity signal; and controlling drive of the gimbal mechanism based on the first to third correction angular velocity signals.

BRIEF DESCRIPTION OF THE DRAWINGS

FIG. 3 is a block diagram illustrating a controller of the gimbal device of the embodiment.

FIG. 4 is a side view illustrating the gimbal mechanism when the imaging device is inclined at a relative angle θ in a tilting motion from the basic attitude.

FIG. 5A is a schematic diagram illustrating the detection axes when the imaging device is inclined at the relative angle θ in a tilting motion from the basic attitude.

FIG. 5B is a schematic diagram illustrating the correction axes of the gimbal mechanism.

FIG. 11 is a side view illustrating the gimbal mechanism when the imaging device is positioned in an attitude of φ=90°.

FIG. 12A is a schematic diagram illustrating the detection axes when the imaging device is inclined at a relative angle of 90° (φ=90°) in a rolling motion from the basic attitude.

FIG. 12B is a schematic diagram illustrating the correction axes of the gimbal mechanism.

DETAILED DESCRIPTION

A gimbal device of the embodiment includes a gimbal mechanism and a controller for controlling the gimbal mechanism.

Figure 1:
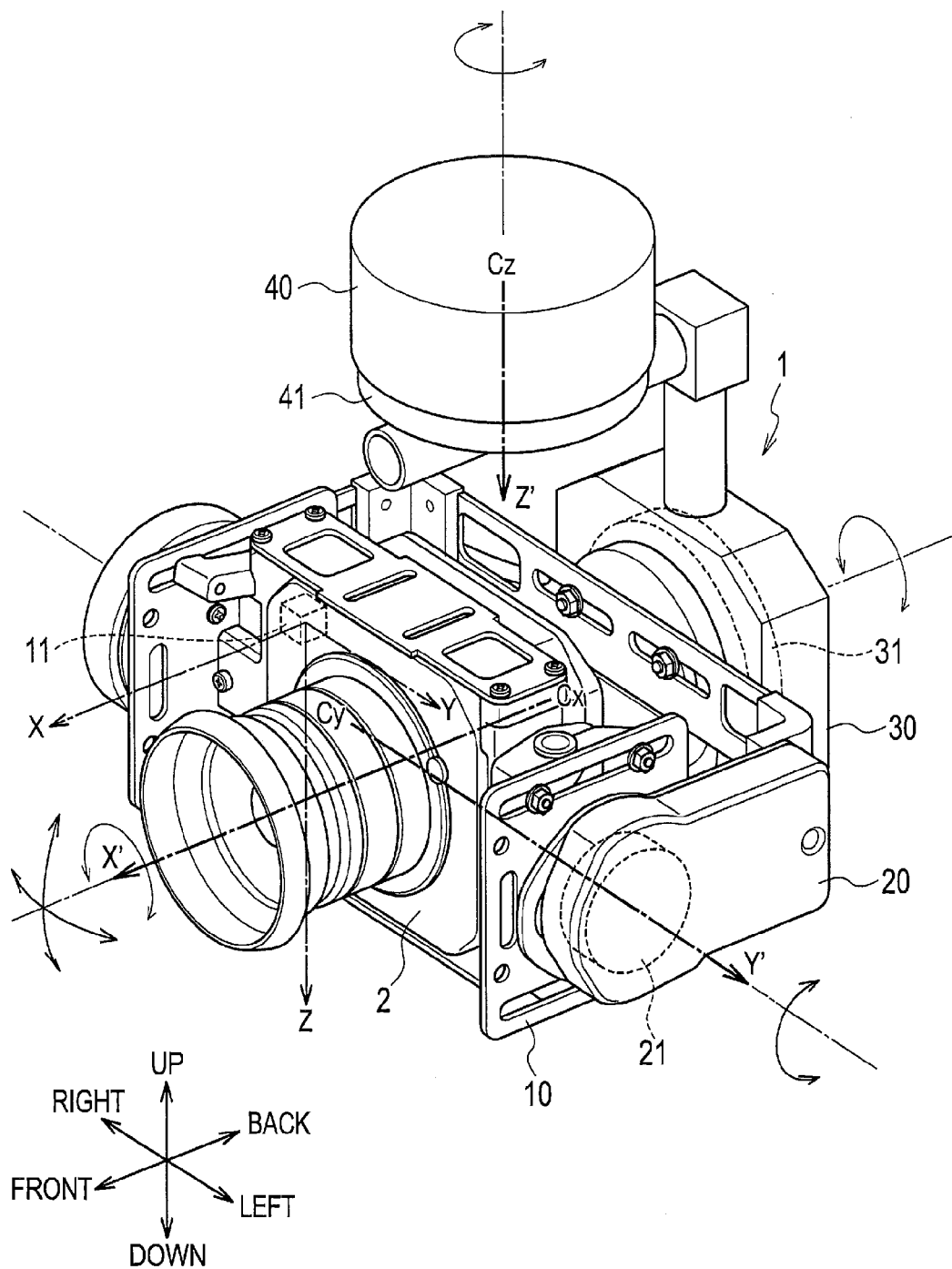
FIG. 1 is a perspective view illustrating a gimbal mechanism in a gimbal device of at least one embodiment.

First, a description is given of the gimbal mechanism of the gimbal device of the embodiment using FIG. 1. FIG. 1 is a perspective view illustrating a basic attitude of an imaging device attached to the gimbal mechanism.

As illustrated in FIG. 1, the gimbal mechanism 1 of the gimbal device of the embodiment includes an imaging device fixing unit 10, to which an imaging device 2 is fixed; a tilting drive unit (a first driver) 20 to drive the imaging device 2 in a tilting motion; a rolling drive unit (a second driver) 30 to drive the imaging device 2 in a rolling motion; and a panning drive unit (a third driver) 40 to drive the imaging device 2 in a panning motion.

The imaging device 2 or imaging device fixing unit 10 is provided with an angular velocity sensor 11. The angular velocity sensor 11 detects an angular velocity (a second angular velocity) about a detection axis X (a second detection axis), an angular velocity (a first angular velocity) about a detection axis Y (a first detection axis), and an angular velocity (a third angular velocity) about a detection axis Z (a third detection axis).

The angular velocity sensor 11 detects a rotational shift of the imaging device 2.

The angular velocity sensor 11 can be an angular velocity sensor provided within the imaging device 2. A typical imaging device includes a built-in angular velocity sensor. Using the built-in angular velocity sensor eliminates the need to adjust the position where an external angular velocity sensor is attached to the imaging device 2 or imaging device fixing unit 10. Moreover, the number of parts can be reduced.

FIG. 1 illustrates a mode in which the angular velocity sensor 11 is provided within the imaging device 2.

The tilting drive unit 20 holds the imaging device fixing unit 10. The tilting drive unit 20 includes a tilting motor 21. The tilting motor 21 rotates the imaging device fixing unit 10 about a rotation axis Cy to drive the imaging device 2 in a tilting motion.

The rolling drive unit 30 holds the tilting drive unit 20. The rolling drive unit 30 includes a rolling motor 31. The rolling motor 31 rotates the tilting drive unit 20 about a rotation axis Cx to drive the imaging device 2 in a rolling motion.

The panning drive unit 40 holds the rolling drive unit 30. The panning drive unit 40 includes a panning motor 41. The panning motor 41 rotates the rolling drive unit 30 about a rotation axis Cz to drive the imaging device 2 in a panning motion.

Using FIGS. 1 and 2, a description is given of the relationship in the gimbal mechanism 1 between the detection axes for detecting rotational shift of the imaging device 2 and the correction axes for correcting the rotational shift of the imaging device 2.

Figure 2A:
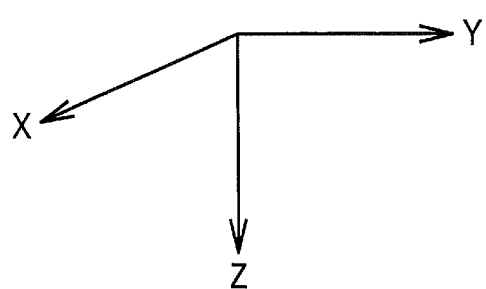
FIG. 2A is a schematic diagram illustrating detection axes when an imaging device is positioned in a basic attitude.
Figure 2B:
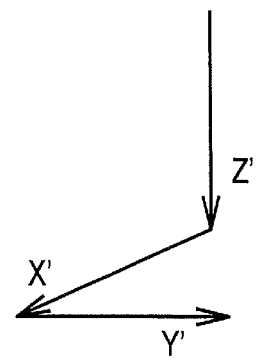
FIG. 2B is a schematic diagram illustrating correction axes of the gimbal mechanism.

FIGS. 2A and 2B are schematic diagrams for explaining the relationship between the detection axes and correction axes when the imaging device 2 is positioned in the basic attitude.

FIG. 2A illustrates the detection axes for detecting the rotational shift of the imaging device 2. The detection axes X, Y and Z are orthogonal to each other. The detection axes X, Y and Z of FIG. 2A correspond to the detection axes X, Y and Z of FIG. 1, respectively.

FIG. 2B illustrates the correction axes for correcting rotational shift of the imaging device 2. The rotational center of a correction axis X' (a second correction axis) is located at the end of a correction axis Z' (a third correction axis), and the rotational center of a correction axis Y' (a first correction axis) is located at the end of the correction axis X'.

As for the relative relationship between the correction axes X', Y' and Z', the correction axes X', Y' and Z' are orthogonal to each other. The correction axes X', Y' and Z' correspond to the rotation axes Cx, Cy and Cz in FIG. 1, respectively.

As illustrated in FIGS. 1, 2A and 2B, when the imaging device 2 is positioned in the basic attitude, the correction axes X', Y' and Z' are parallel to the detection axes X, Y and Z, respectively. That is, when the imaging device 2 is positioned in the basic attitude, the detection axes X, Y and Z directly correspond to the correction axes X', Y' and Z', respectively.

Next, a description is given of the controller of the gimbal device of the embodiment using FIG. 3. FIG. 3 is a block diagram illustrating the controller for controlling drive of the gimbal mechanism of FIG. 1.

As illustrated in FIG. 3, the controller 50 of the gimbal device of the embodiment includes a command input unit 51, a target angular velocity generator 52, an angular velocity signal acquisition unit 53, a relative angle acquisition unit 54, an angular velocity signal synthesizer 55, an adder-subtractor 56, a servo calculator 57, and a motor driver 58.

The controller 50 can be composed of a microcomputer or a microprocessor. Each unit of the controller 50 can be composed of software. The same function as each unit of the controller 50 may be composed of hardware (circuits). In FIG. 3, the use of hardware or software is optional.

The target angular velocity generator 52 receives through the command input unit 51, a panning command signal PC, a tilting command signal TC, and a rolling command signal RC which are outputted by operator's remote operation. That is, the panning, tilting and rolling command signals PC, TC and RC are input signals inputted to the target angular velocity generator 52 through the command input unit 51.

The panning command signal PC is a manual control command signal to drive the imaging device 2 (refer to FIG. 1) in a panning motion. The tilting command signal TC is a manual control command signal to drive the imaging device 2 in a tilting motion. The rolling command signal RC is a manual control command signal to drive the imaging device 2 in a rolling motion.

The target angular velocity generator 52 generates a target angular velocity signal Za (a third target angular velocity signal), which is a signal of target angular velocity about an axis parallel to the correction axis Z', based on the panning command signal PC.

The target angular velocity generator 52 generates a target angular velocity signal Ya (a first target angular velocity signal), which is a signal of target angular velocity about an axis parallel to the correction axis Y', based on the tilting command signal TC.

The target angular velocity generator 52 generates a target angular velocity signal Xa (a second target angular velocity signal), which is a signal of target angular velocity about an axis parallel to the correction axis X', based on the rolling command signal RC.

The angular velocity signal acquisition unit 53 acquires an angular velocity signal X1 (a second angular velocity signal), which is a signal of angular velocity about an axis parallel to the detection axis X (the second detection axis), an angular velocity signal Y1 (a first angular velocity signal), which is a signal of angular velocity about an axis parallel to the detection axis Y (the first detection axis), and an angular velocity signal Z1 (a third angular velocity signal), which is a signal of angular velocity about an axis parallel to the detection axis Z (the third detection axis) from the rotational shift detected by the angular velocity sensor 11 (refer to FIG. 1).

The relative angle acquisition unit 54 acquires a relative angle θ (a first relative angle) and a relative angle φ (a second relative angle).

Herein, the relative angle θ is described with reference to FIGS. 4, 5A and 5B. FIG. 4 is a side view of the gimbal mechanism 1 of FIG. 1 seen from the rotation axis Cy side. FIGS. 5A and 5B correspond to FIGS. 2A and 2B, respectively.

As illustrated in FIG. 4, the relative angle θ is an angle at which the imaging device 2 is inclined in a tilting motion from the basic attitude (refer to FIG. 1).

As illustrated in FIG. 5A, the relative angle θ is a relative angle between the detection axis X and correction axis X' in a two-dimensional plane orthogonal to the correction axis Y'.

Figure 6:
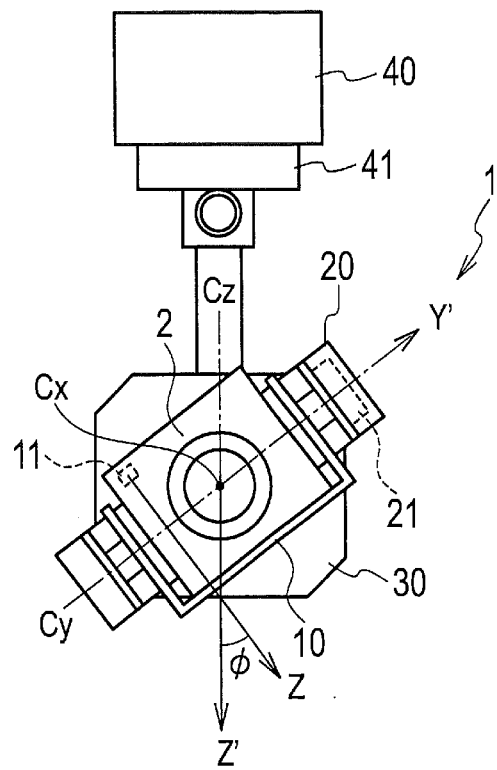
FIG. 6 is a side view illustrating the gimbal mechanism when the imaging device is inclined at a relative angle φ in a rolling motion from the basic attitude.
Figure 7A:
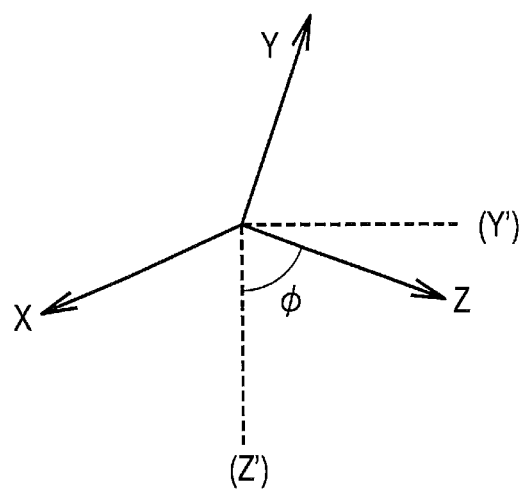
FIG. 7A is a schematic diagram illustrating the detection axes when the imaging device is inclined at the relative angle T in a rolling motion from the basic attitude.
Figure 7B:
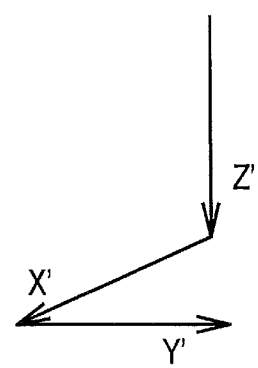
FIG. 7B is a schematic diagram illustrating the correction axes of the gimbal mechanism.

Next, the relative angle φ is described with reference to FIGS. 6, 7A and 7B. FIG. 6 is a side view of the gimbal mechanism 1 of FIG. 1 seen from the rotation axis Cx side. FIGS. 7A and 7B correspond to FIGS. 2A and 2B, respectively.

As illustrated in FIG. 6, the relative angle φ is an angle at which the imaging device 2 is inclined in a rolling motion from the basic attitude.

As illustrated in FIG. 7A, the relative angle φ is a relative angle between the detection axis Z and correction axis Z' in a two-dimensional plane orthogonal to the correction axis X'.

The relative angle acquisition unit 54 can acquire the relative angles θ and φ based on a horizontal angle detected by an acceleration sensor provided in the imaging device 2 or imaging device fixing unit 10, for example.

In another mode, the relative angle acquisition unit 54 calculates a difference between the horizontal angle detected by the aforementioned acceleration sensor (a first acceleration sensor) and a second acceleration sensor installed in a place different from the imaging device 2 or imaging device fixing unit 10, and can acquire the relative angles θ and φ based on the calculated difference.

In still another mode, the relative angle acquisition unit 54 counts rotation angles of the tilting motor 21, rolling motor 31, and panning motor 41, and can acquire the relative angles θ and φ based on the counted rotation angles.

The angular velocity signal synthesizer 55 calculates a rotational shift angular velocity signal Xb, which is a signal of rotational shift angular velocity about an axis parallel to the correction axis X', and a rotational shift angular velocity signal Zb, which is a signal of rotational shift angular velocity about an axis parallel to the correction axis Z', based on the angular velocity signals X1, Y1 and Z1 acquired by the angular velocity signal acquisition unit 53 and the relative angles θ and φ acquired by the relative angle acquisition unit 54.

The rotational shift angular velocity signal Xb is calculated by using Equation (1).

$$Xb = X1 * \cos \theta - Z1 * \sin \theta \tag{1}$$

As shown in Equation (1), the rotational shift angular velocity Xb of the correction axis X' is a signal obtained by synthesizing the angular velocity signal X1 of the detection axis X and the angular velocity signal Z1 of the detection axis Y.

A rotational shift angular velocity signal Yb, which is a signal of rotational shift angular velocity about an axis parallel to the correction axis Y', is expressed by Equation (2).

$$Yb = Y1 \tag{2}$$

Based on Equation (2), the angular velocity signal Y1 is used as the rotational shift angular velocity signal Yb.

The rotational shift angular velocity signal Zb is calculated by using Equation (3).

$$Zb = X1 * \sin \theta * \cos \phi - Y1 * \sin \phi + Z1 * \cos \theta * \cos \phi \tag{3}$$

As shown in Equation (3), the rotational shift angular velocity signal Zb of the correction axis Z' is a signal obtained by synthesizing the angular velocity signal X1 of the detection axis X, the angular velocity signal Y1 of the detection axis Y, and the angular velocity signal Z1 of the detection axis Z.

The adder-subtractor 56 receives the target angular velocity signals Xa, Ya and Za from the target angular velocity generator 52, and receives the rotational shift angular velocity signals Xb, Yb and Zb from the angular velocity signal synthesizer 55.

The adder-subtractor 56 calculates a difference between the target angular velocity signal Xa and rotational shift angular velocity signal Xb, and outputs the calculated difference as a correction angular velocity signal Xc.

The adder-subtractor 56 calculates a difference between the target angular velocity signal Ya and rotational shift angular velocity signal Yb, and outputs the calculated difference as a correction angular velocity signal Yc.

The adder-subtractor 56 calculates a difference between the target angular velocity signal Za and rotational shift angular velocity signal Zb, and outputs the calculated difference as a correction angular velocity signal Zc.

The servo-calculator 57 generates a servo signal Xd to control drive of the rolling motor 31 based on the correction angular velocity signal Xc outputted from the adder-subtractor 56.

The servo-calculator 57 generates a servo signal Yd to control drive of the tilting motor 21 based on the correction angular velocity signal Yc outputted from the adder-subtractor 56.

The servo-calculator 57 generates a servo signal Zd to control drive of the panning motor 41 based on the correction angular velocity signal Zc outputted from the adder-subtractor 56.

The motor driver 58 controls drive of the rolling motor 31 based on the servo signal Xd generated by the servo calculator 57 so as to cancel the rotational shift of the imaging device 2 in a rolling motion.

The motor driver 58 controls drive of the tilting motor 21 based on the servo signal Yd generated by the servo calculator 57 so as to cancel the rotational shift of the imaging device 2 in a tilting motion.

The motor driver 58 controls drive of the panning motor 41 based on the servo signal Zd generated by the servo calculator 57 so as to cancel the rotational shift of the imaging device 2 in a panning motion.

The servo calculator 57 and motor driver 58 serve as a drive controller to control drive of the tilting motor 21, rolling motor 31 and panning motor 41.

Figure 8:
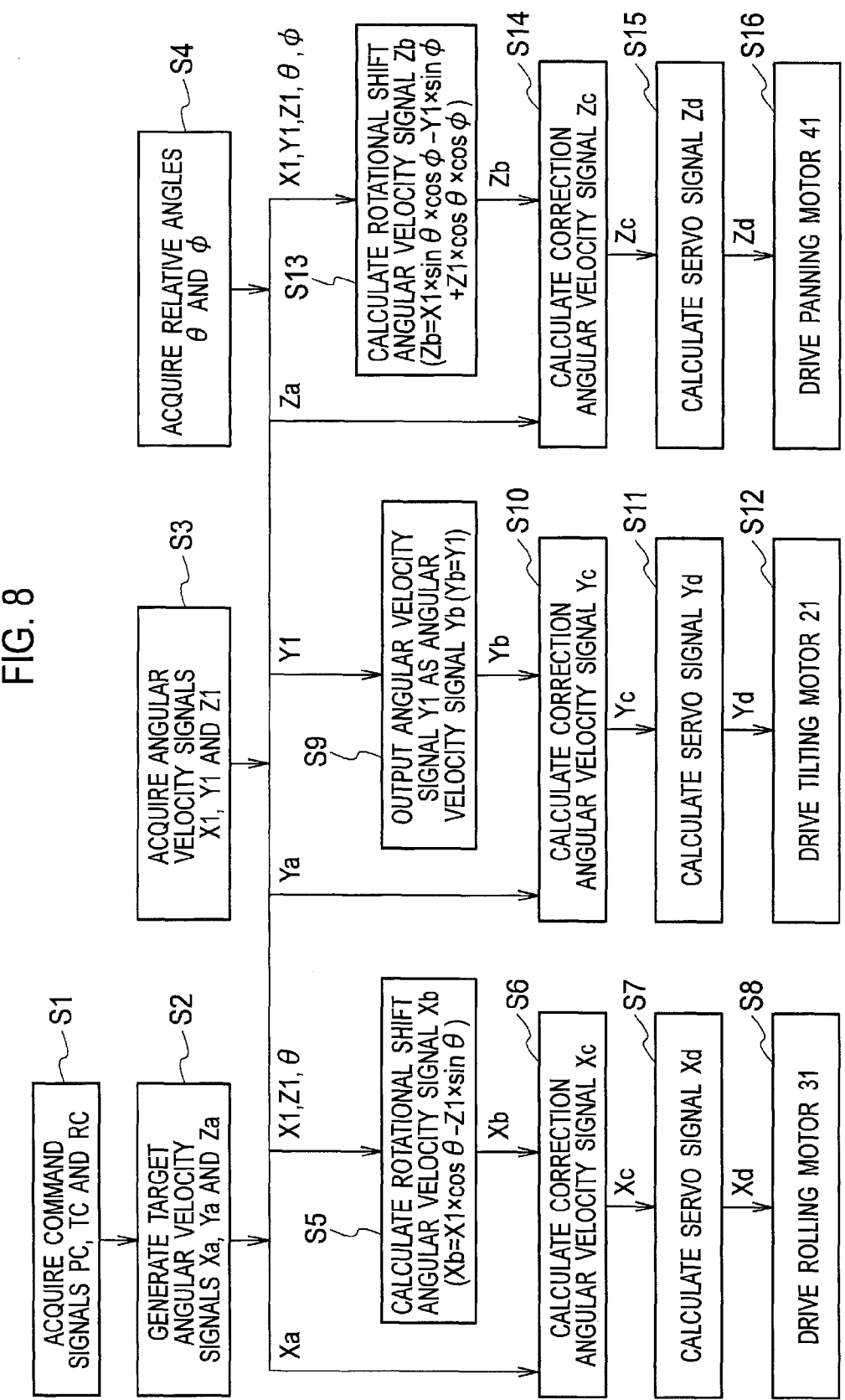
FIG. 8 is a flowchart for explaining a control method of the gimbal device to correct rotational shift of the imaging device for attitude control.

Next, with reference to the flowchart illustrated in FIG. 8, a description is given of a control method of the gimbal device which corrects the rotational shift of the imaging device for attitude control.

In step S1, the target angular velocity generator 52 acquires through the command input unit 51, the panning, tilting and rolling command signals PC, TC and RC outputted by the operator's remote operation.

In step S2, the target angular velocity generator 52 generates the target angular velocity signal Za based on the panning command signal PC.

In the step S2, the target angular velocity generator 52 generates the target angular velocity signal Ya based on the tilting command signal TC.

In the step S2, the target angular velocity generator 53 generates the target angular velocity signal Xa based on the rolling command signal RC.

In step S3, the angular velocity signal acquisition unit 53 acquires the angular velocity signals X1, Y1 and Z1 from the rotational shift detected by the angular velocity sensor 11.

In step S4, the relative angle acquisition unit 54 acquires the relative angles θ and φ.

The description is given of the correction of the rotational shift about the correction axis X'.

In step S5, the angular velocity signal synthesizer 55 calculates the rotational shift angular velocity signal Xb based on Equation (1) from the angular velocity signals X1 and Z1 acquired by the angular velocity signal acquisition unit 53 and the relative angle θ acquired by the relative angle acquisition unit 54.

In step S6, the adder-subtractor 56 calculates the difference between the target angular velocity signal Xa generated by the target angular velocity generator 52 and the rotational shift angular velocity signal Xb calculated by the angular velocity signal synthesizer 55, and outputs the calculated difference as the correction angular velocity signal Xc.

In step S7, the servo calculator 57 generates the servo signal Xd from the correction angular velocity signal Xc outputted from the adder-subtractor 56.

In step S8, the motor driver 58 controls drive of the rolling motor 31 based on the servo signal Xd generated by the servo calculator 57 so as to cancel the rotational shift of the imaging device 2 in a rolling motion.

A description is given of correction of rotational shift about the correction axis Y'.

In step S9, the angular velocity signal synthesizer 55 outputs the angular velocity signal Y1 acquired by the angular velocity signal acquisition unit 53 as the rotational shift angular velocity signal Yb based on Equation (2).

In step S10, the adder-subtractor 56 calculates the difference between the target angular velocity signal Ya generated by the target angular velocity generator 52 and the rotational shift angular velocity signal Yb calculated by the angular velocity signal synthesizer 55, and outputs the calculated difference as the correction angular velocity signal Yc.

In step S11, the servo calculation unit 57 generates the servo signal Yd from the correction angular velocity signal Yc outputted from the adder-subtractor 56.

In step S12, the motor driver 58 controls drive of the tilting motor 21 based on the servo signal Yd generated by the servo calculator 57 so as to cancel the rotational shift of the imaging device 2 in a tilting motion.

A description is given of the correction of the rotational shift around the correction axis Z'.

In step S13, the angular velocity signal synthesizer 55 calculates the rotational shift angular velocity signal Zb based on Equation (3) from the angular velocity signals X1, Y1 and Z1 acquired by the angular velocity signal acquisition unit 53 and the relative angles θ and φ acquired by the relative angle acquisition unit 54.

In step S14, the adder-subtractor 56 calculates the difference between the target angular velocity signal Za generated by the target angular velocity generator 52 and the rotational shift angular velocity signal Zb calculated by the angular velocity signal synthesizer 55, and outputs the calculated difference as the correction angular velocity signal Zc.

In step S15, the servo calculator 57 generates the servo signal Zd from the correction angular velocity signal Zc outputted from the adder-subtractor 56.

In step S16, the motor driver 58 controls drive of the panning motor 41 based on the servo signal Zd generated by the servo calculator 57 so as to cancel the rotational shift of the imaging device 2 in a panning motion.

With reference to FIGS. 1, 2A, 2B, 4, 5A, 5B, 6, 7A, 7B, 9, 10A, 10B, 11, 12A and 12B and Equations (1) to (3), a description is given of the relationship between the detection axes X, Y and Z and correction axes X', Y' and Z' with regard to correction of the rotational shift of the imaging device 2, and the relationship between the angular velocity signals X1, Y1 and Z1 of the detection axes X, Y and Z and the rotational shift angular velocity signals Xb, Yb and Zb of the correction axes X', Y' and Z'.

First, correction of the rotational shift of the imaging device 2 positioned in the basic attitude is described using FIGS. 1, 2A and 2B.

As illustrated in FIGS. 1, 2A and 2B, when the imaging device 2 is positioned in the basic attitude, the detection axes X, Y and Z are parallel to the correction axes X', Y' and Z', respectively and directly correspond to the correction axes X', Y' and Z', respectively. That is, the relative angle $\theta$ between the detection axis X and correction angle X' is zero ($\theta=0°$), and the relative angle $\phi$ between the detection axis Z and correction angle Z' is also zero ($\phi=0°$).

Based on Equations (1) to (3), Xb=X1, Yb=Y1, and Zb=Z1.

In correction of the rotational shift of the imaging device 2 positioned in the basic attitude, the angular velocity signals X1, Y1, and Z1 are processed as the rotational shift angular velocity signals Xb, Yb, and Zb, respectively.

Correction of rotational shift of the imaging device 2 which is inclined at the relative angle $\theta$ in the tilting direction from the basic attitude is described using FIGS. 4, 5A and 5B. The relative angle $\phi$ is zero ($\phi=0°$) when the imaging device 2 is in such an attitude.

Based on Equations (1) to (3), Xb=X1*cos $\theta$−Z1*sin $\theta$, Yb=Y1, and Zb=X1*sin $\theta$+Z1*cos $\theta$.

In the correction of rotational shift of the imaging device 2 which is inclined at the relative angle $\theta$ in a tilting motion from the basic attitude ($\phi=0°$), the signal obtained by synthesizing the angular velocity signal X1 and the angular velocity signal Z1 is processed as the rotational shift angular velocity signal Xb. The angular velocity signal Y1 is processed as the rotational shift angular velocity signal Yb. The signal obtained by synthesizing the angular velocity signal X1 and the angular velocity signal Z1 is processed as the rotational shift angular velocity signal Zb.

Figure 9:
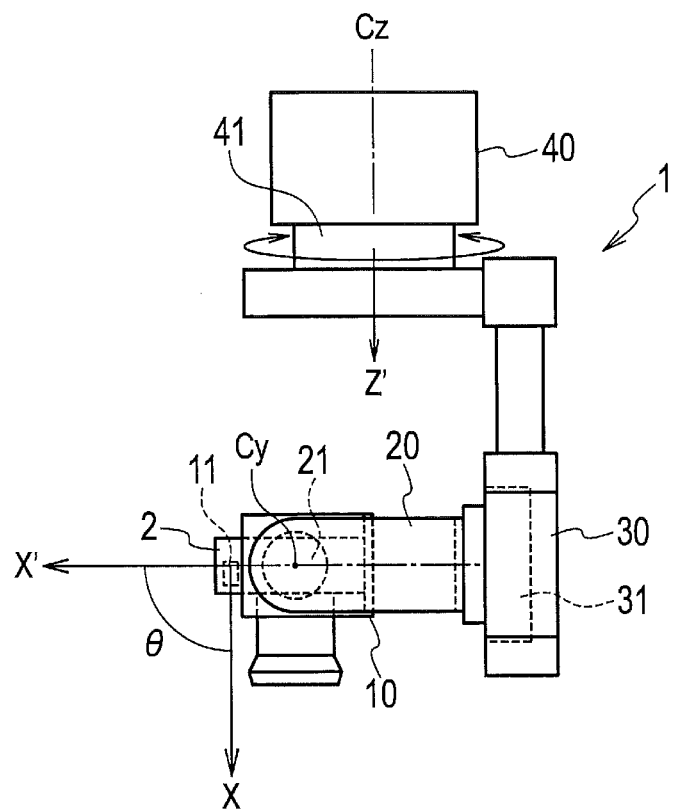
FIG. 9 is a side view illustrating the gimbal mechanism when the imaging device is positioned in an attitude of θ=90°.
Figure 10A:
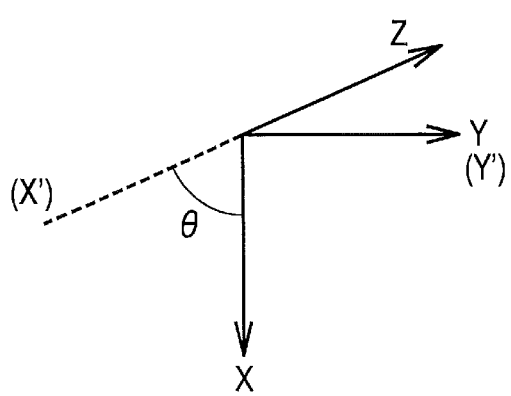
FIG. 10A is a schematic diagram illustrating the detection axes when the imaging device is inclined at a relative angle of 90° (θ=90°) in a tilting motion from the basic attitude.
Figure 10B:
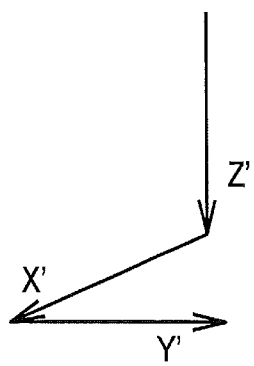
FIG. 10B is a schematic diagram illustrating the correction axes of the gimbal mechanism.

FIGS. 9, 10A and 10B illustrate the imaging device 2 positioned in an attitude with the relative angle $\theta=90°$ ($\phi=0°$).

Based on Equations (1) to (3), Xb=−Z1, Yb=Y1, and Zb=X1.

That is, in the correction of rotational shift of the imaging device 2 which is positioned with the relative angle $\theta=90°$ ($\phi=0°$), the angular velocity signal Z1 is processed as the rotational shift angular velocity signal Xb on the correction axis X' different from that of the basic attitude. The angular velocity signal X1 is processed as the rotational shift angular velocity signal Zb on the correction axis Z', which is different from that of the basic attitude.

Correction of rotational shift of the imaging device 2 which is inclined at the relative angle $\phi$ in the rolling direction from the basic attitude is described with reference to FIGS. 6, 7A and 7B. The relative angle $\theta$ is zero ($\theta=0°$) when the imaging device 2 is positioned as illustrated in FIG. 6.

Based on Equations (1) to (3), Xb=X1, Yb=Y1, and Zb=Z1*cos $\phi$−Y1*sin $\phi$.

In the correction of rotational shift of the imaging device 2 which is inclined at the relative angle $\phi$ in the rolling direction from the basic attitude ($\theta=0°$), the angular velocity signal X1 is processed as the rotational shift angular velocity signal Xb. The angular velocity signal Y1 is processed as the rotational shift angular velocity signal Yb. The signal obtained by synthesizing the angular velocity signal Z1 and the angular velocity signal Y1 is processed as the rotational shift angular velocity signal Zb.

FIGS. 11, 12A and 12B illustrate the imaging device 2 positioned in an attitude with the relative angle $\phi=90°$ ($\theta=0°$). In FIG. 11, the rotational axis Cy and the correction axis, and the rotational axis Cz and the correction axis Z' are illustrated slightly offset from each other, for improving the visualization.

Based on Equations (1) to (3), Xb=X1, Yb=Y1, and Zb=−Y1

That is, in the correction of the rotational shift of the imaging device 2 positioned in an attitude with the relative angle $\phi=90°$ ($\theta=0°$), the angular velocity signal Y1 is also processed as the rotational shift angular velocity signal Zb, which is different from that of the basic attitude.

The above description is given of the attitude with an inclination of only the relative angle $\theta$ ($\phi=0°$) and the attitude with an inclination of only the relative angle $\phi$ ($\theta=0°$). However, rotational shift composed of a combination of the attitude with an inclination of the relative angle $\theta$ and the attitude with an inclination of the relative angle $\phi$ can be corrected by calculating the rotational shift angular velocity signals Xb, Yb and Zb of the correction axes X', Y' and Z' based on Equations (1) to (3).

Figure 13:
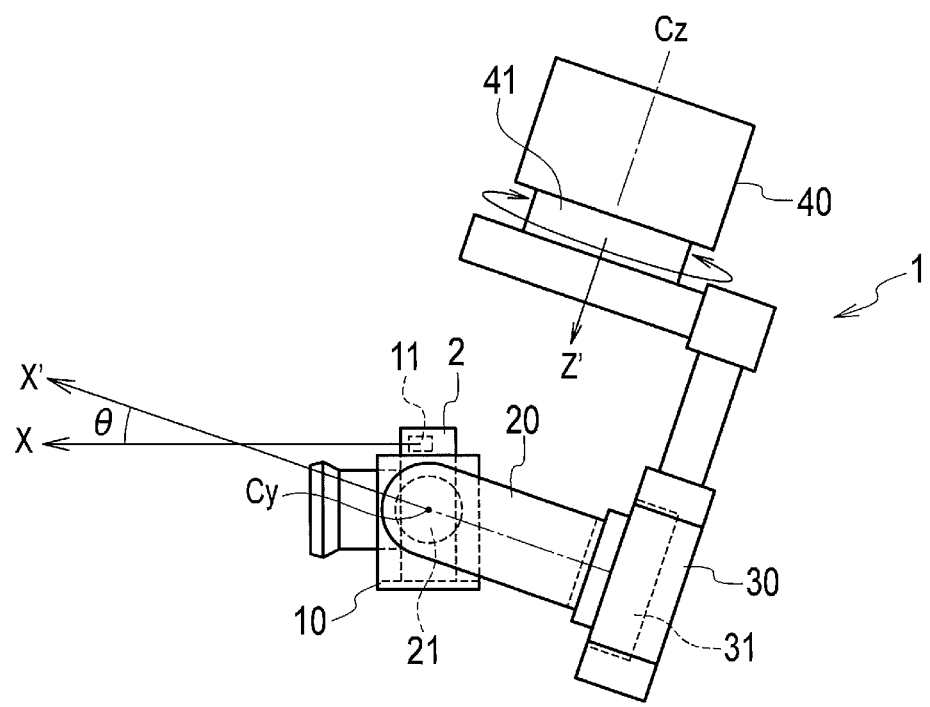
FIG. 13 is a side view illustrating the gimbal mechanism when the imaging device is inclined at the relative angle θ.

FIG. 13 is a side view of the gimbal mechanism 1 inclined at the relative angle $\theta$.

In airborne imaging performed with an imaging device mounted on an unmanned helicopter or airplane, for example, the gimbal mechanism 1 itself is inclined in some cases.

Even when the gimbal mechanism 1 itself is inclined as illustrated in FIG. 13, the rotational shift of the imaging device 2 can be corrected by using Equations (1) to (3).

According to the gimbal device and the control method of the gimbal device of the embodiment, it is possible to correct the rotational shift of the imaging device with high accuracy and control the attitude of the imaging device when the imaging device or gimbal mechanism is positioned in any attitude. According to the gimbal device and the control method of the gimbal device of the embodiment, it is possible to correct the rotational shift of the imaging device with high accuracy and control the attitude of the imaging device even when the imaging device is largely inclined.

The present invention is not limited to the embodiment described above and can be variously changed without departing from the scope of the present invention.

What is claimed is:
1. A gimbal device comprising:
a controller configured to control a gimbal mechanism to which an imaging device is fixed, wherein
detection axes for detecting a rotational shift of the imaging device are defined as first to third detection axes which are orthogonal to each other,
correction axes for correcting the rotational shift of the imaging device are defined as first to third correction axes which are orthogonal to each other,
the controller includes:
an angular velocity signal acquisition unit configured to acquire first to third angular velocity signals which are signals of first angular velocity about an axis parallel to the first detection axis, second angular velocity about an axis parallel to the second detec- tion axis, and third angular velocity about an axis parallel to the third detection axis, respectively;

a relative angle acquisition unit configured to acquire a first relative angle between the second detection axis and the second correction axis in a two-dimensional plane orthogonal to the first correction axis and a second relative angle between the third detection axis and the third correction axis in a two-dimensional plane orthogonal to the second correction axis; and an angular velocity signal synthesizer configured to generate from the first to third angular velocity signals and the first and second relative angles, first to third rotational shift angular velocity signals which are signals of a first rotational shift angular velocity about an axis parallel to the first correction axis, a second rotational shift angular velocity about an axis parallel to the second correction axis, and a third rotational shift angular velocity about an axis parallel to the third correction axis, respectively.

2. The gimbal device according to claim 1, wherein the gimbal mechanism includes:

an imaging device fixing unit to which the imaging device is fixed;

a first driver configured to rotate the imaging device around the first correction axis;

a second driver configured to rotate the imaging device around the second correction axis; and a third driver configured to rotate the imaging device around the third correction axis, and the controller further includes:

a target angular velocity generator configured to generate first to third target angular velocity signals which are signals of first target angular velocity about an axis parallel to the first correction axis, second target angular velocity about an axis parallel to the second correction axis, and third target angular velocity about an axis parallel to the third correction axis, respectively;

an adder-subtractor configured to generate a first correction angular velocity signal from the first target angular velocity signal and the first rotational shift angular velocity signal, generate a second correction angular velocity signal from the second target angular velocity signal and the second rotational shift angular velocity signal, and generate a third correction angular velocity signal from the third target angular velocity signal and the third rotational shift angular velocity signal; and a drive controller configured to control the first driver based on the first correction angular velocity signal, control the second driver based on the second correction angular velocity signal, and control the third driver based on the third correction angular velocity signal.

3. The gimbal device according to claim 1, wherein the angular velocity signal synthesizer acquires the first to third rotational shift angular velocity signals based on a first relational Equation of $Xb = X1 * \cos\theta - Z1 * \sin\theta$, a second relational Equation of $Yb = Y1$, and a third relational Equation of $Zb = X1 * \sin\theta * \cos\phi - Y1 * \sin\phi + Z1 * \cos\theta * \cos\phi$, where Y1, X1 and Z1 are the first to third angular velocity signals, respectively, Yb, Xb and Zb are the first to third rotational shift angular velocity signals, respectively, and $\theta$ and $\phi$ are the first and second relative angles, respectively.

4. A control method of controlling a gimbal device including a gimbal mechanism to which an imaging device is fixed, wherein detection axes for detecting a rotational shift of the imaging device are defined as first to third detection axes which are orthogonal to each other, correction axes for correcting the rotational shift of the imaging device are defined as first to third correction axes which are orthogonal to each other, the control method comprising:

generating first to third target angular velocity signals which are signals of first target angular velocity about an axis parallel to the first correction axis, second target angular velocity about an axis parallel to the second correction axis, and third target angular velocity about an axis parallel to the third correction axis, respectively;

acquiring first to third angular velocity signals which are signals of first angular velocity about an axis parallel to the first detection axis, second angular velocity about an axis parallel to the second detection axis, and third angular velocity about an axis parallel to the third detection axis, respectively;

acquiring a first relative angle between the second detection axis and the second correction axis in a two-dimensional plane orthogonal to the first correction axis and a second relative angle between the third detection axis and the third correction axis in a two-dimensional plane orthogonal to the second correction axis;

generating from the first to third angular velocity signals and the first and second relative angles, first to third rotational shift angular velocity signals which are signals of a first rotational shift angular velocity about an axis parallel to the first correction axis, a second rotational shift angular velocity about an axis parallel to the second correction axis, and a third rotational shift angular velocity about an axis parallel to the third correction axis, respectively;

generating a first correction angular velocity signal from the first target angular velocity signal and the first rotational shift angular velocity signal, generating a second correction angular velocity signal from the second target angular velocity signal and the second rotational shift angular velocity signal, and generating a third correction angular velocity signal from the third target angular velocity signal and the third rotational shift angular velocity signal; and controlling drive of the gimbal mechanism based on the first to third correction angular velocity signals.

* * * * *